(12) United States Patent
Wu

(10) Patent No.: US 6,202,639 B1
(45) Date of Patent: Mar. 20, 2001

(54) SWITCH ASSEMBLY BARBECUE GRILL

(75) Inventor: Sen-Yu Wu, Taichung Hsien (TW)

(73) Assignee: Seven Universe Industrial Co., Ltd., Taichung Hsien (TW)

( * ) Notice: Subject to any disclaimer, the term of this patent is extended or adjusted under 35 U.S.C. 154(b) by 0 days.

(21) Appl. No.: 09/558,382

(22) Filed: Apr. 26, 2000

(51) Int. Cl.⁷ ...................................................... F24C 3/00
(52) U.S. Cl. ..................... 126/39 N; 126/41 R; 137/875; 137/876
(58) Field of Search ................................ 126/39 N, 39 R, 126/41 R, 39 E, 39 J; 285/126.1, 179.1; 137/875, 876, 315.16, 315.17

(56) References Cited

U.S. PATENT DOCUMENTS

| | | | |
|---|---|---|---|
| 1,775,980 | * | 9/1930 | Walbridge .......................... 126/39 N |
| 2,749,148 | * | 6/1956 | Schneiderman .................... 285/126.1 |
| 4,508,371 | * | 4/1985 | Maier ................................ 285/126.1 |
| 5,127,824 | * | 7/1992 | Barker ................................ 126/41 R |

\* cited by examiner

Primary Examiner—James C. Yeung
(74) Attorney, Agent, or Firm—Rosenberg, Klein & Lee

(57) ABSTRACT

A switch assembly for a barbecue grill includes two pipes with a connection tube integrally connected between the two pipes. The two pipes and the connection tube are made by way of casting so as to be a one-piece member. The connection tube has a groove defined in a top thereof and the groove communicates with the two pipes. A cap is connected to the top of the connection tube to seal the groove.

2 Claims, 4 Drawing Sheets

SWITCH ASSEMBLY BARBECUE GRILL

FIELD OF THE INVENTION

The present invention relates to a switch assembly for a barbecue grill and the switch assembly includes two pipes with a connection tube connected therebetween. The switch assembly is made as a one-piece member.

BACKGROUND OF THE INVENTION

A conventional switch assembly is shown in FIG. 1 and generally includes two pipes 11, 12 with a connection tube 10 connected between the two pipes 11, 12. Each pipe 11/12 has a threaded fitting 111 extending therefrom and the connection tube 10 has two threaded holes in two ends thereof so that the two pipes 11, 12 are respectively connected to the connection tube 10 by threading the two threaded fittings 111 with the two threaded holes. When connecting the pipes 11, 12 to the connection tube 10, the pipes 11, 12 are rotated to fasten the engagement of the threaded fittings 111 with the threaded holes. It is to be noted that each of the two pipes 11, 12 has an inclined section 110/120 for being connected to other parts. Nevertheless, because the two pipes 11, 12 have to be rotated to be connected to the connection tube 10 so that a distance "D" between the two inclined sections 110, 120 could not be maintained. Furthermore, a pre-determined angle "A" that each pipe 11/12 is supposed to be could not maintained because of the threading engagement. It takes a lot of time to respectively connect the pipes 11, 12 to the connection tube 10 for assemblers.

The present invention intends to provide a switch assembly for a barbecue grill wherein the pipes and the connection tube are made to be a one-piece member so that the distance "D" and the angle "A" can be precisely maintained.

SUMMARY OF THE INVENTION

In accordance with one aspect of the present invention, there is provided a switch assembly for a barbecue grill and comprising two pipes with a connection tube integrally connected between the two pipes. The connection tube has a groove defined in a top thereof and the groove communicates with the two pipes. A cap is connected to the top of the connection tube to seal the groove.

The object of the present invention is to provide an integrally made switch assembly for a barbecue grill so that the position relationship between the pipes and the connection tube can be precisely maintained.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
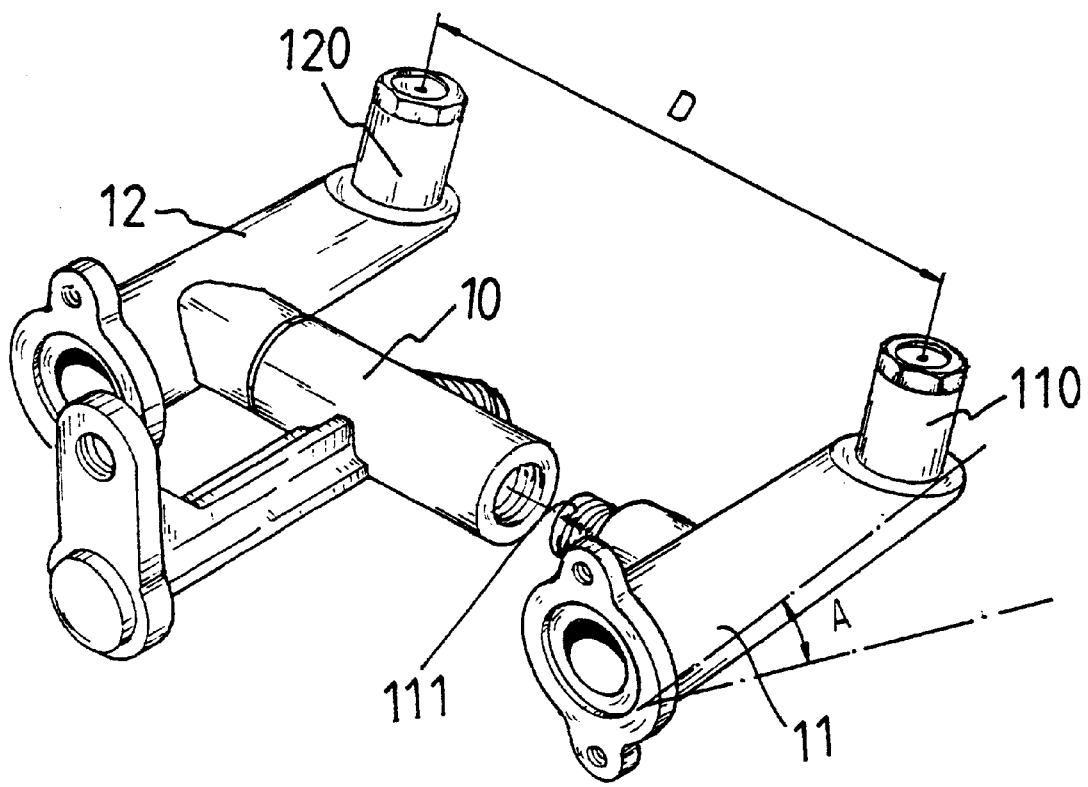
FIG. 1 is an exploded view to show a conventional switch assembly of a barbecue grill.
Figure 2:
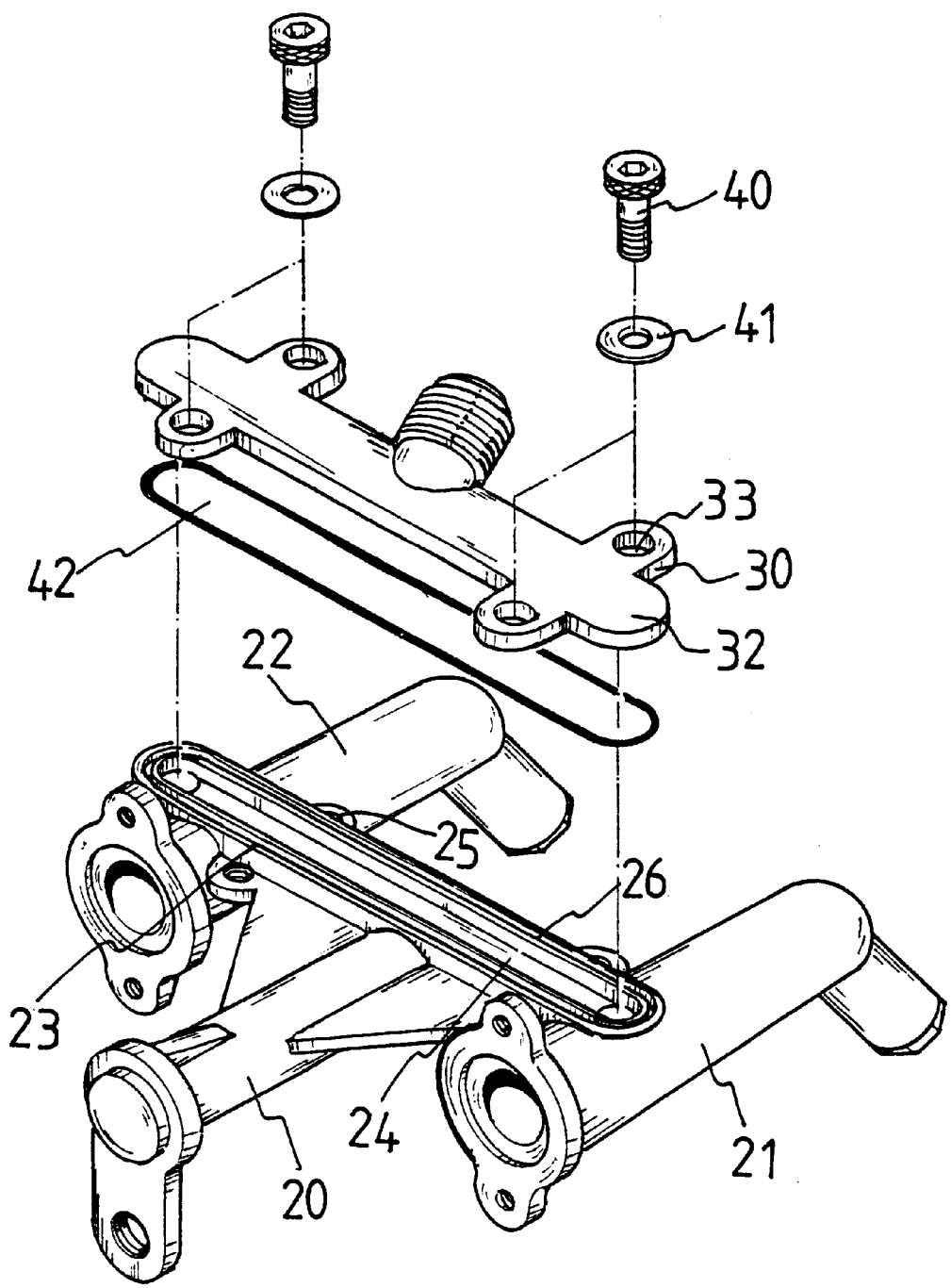
FIG. 2 is an exploded view to show a switch assembly of a barbecue grill of the present invention.
Figure 3:
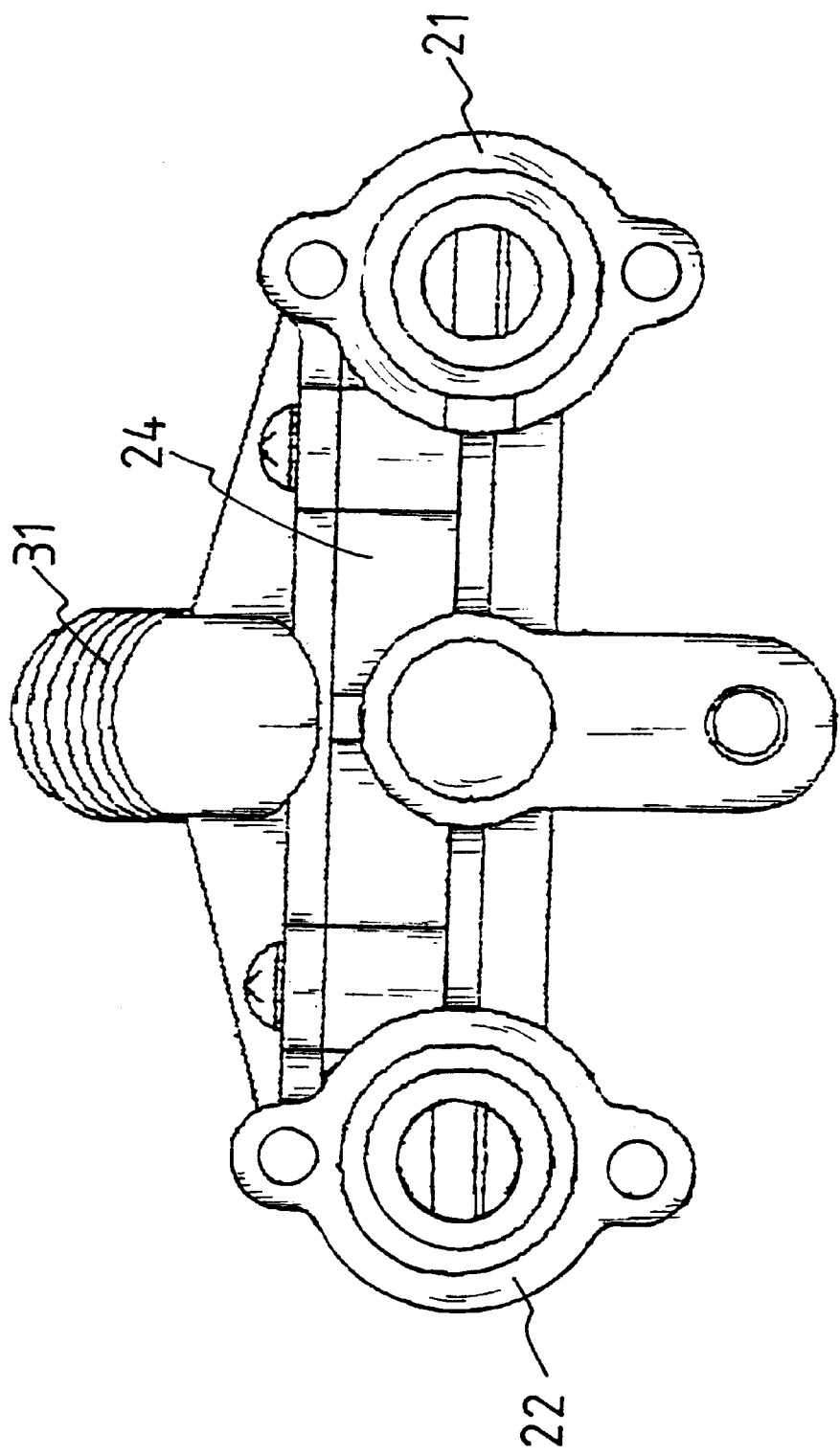
FIG. 3 is a plan view to show the switch assembly of the present invention.
Figure 4:
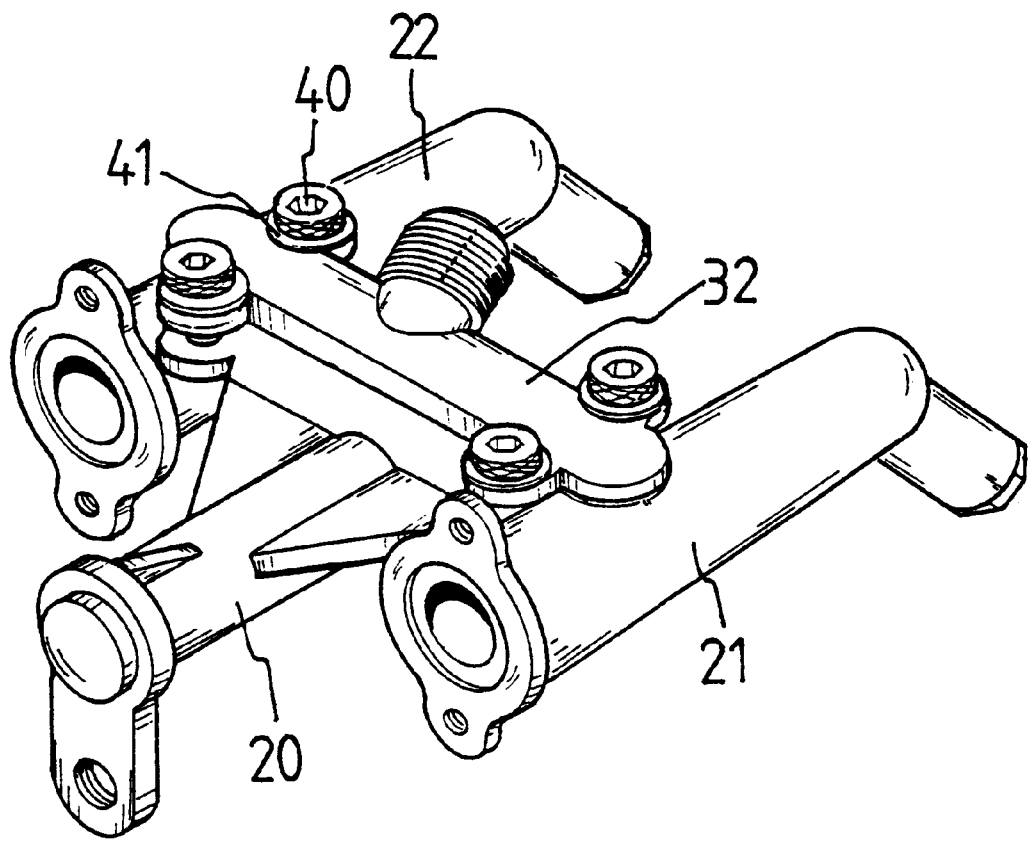
FIG. 4 is a perspective view of the switch assembly of a barbecue grill of the present invention.

Referring to FIGS. 2 to 4, the switch assembly for a barbecue grill in accordance with the present invention comprises two pipes 21, 22 with a connection tube 23 integrally connected between the two pipes 21, 22. The two pipes 21, 22, the connection tube 23 and an extension tube 20 extending from the connection tube 23 are made by way of casting so as to be a one-piece member. The connection tube 23 has a groove 24 defined in a top thereof and the groove 24 communicates with the two pipes 21, 22. A slit 26 is defined in a top edge of the top of the connection tube 23 so that a seal ring 42 is engaged with the slit 26.

A cap 32 is connected to the top of the connection tube 23 to seal the groove 24. Four first lugs 25 extend from two sides of the connection tube 23 and the cap 32 has four second lugs 30 and each second lug 30 having a hole 33. The second lugs 30 are connected to the first lugs 25 by extending bolts 40 through washers 41, the holes 33 in the second lugs 30 and threadedly engaged with the first lugs 25.

The position relationship between the two pipes 21, 22 and the connection tube 23 can be precisely maintained as desired because they are made integrally by way of casting.

While we have shown and described various embodiments in accordance with the present invention, it should be clear to those skilled in the art that further embodiments may be made without departing from the scope and spirit of the present invention.

What is claimed is:

1. A switch assembly for a barbecue grill, comprising:

two pipes with a connection tube integrally connected between said two pipes, said connection tube having a groove defined in a top thereof and said groove communicating with said two pipes, a slit defined in a top edge of said top of said connection tube and a seal ring engaged with said slit, four first lugs extending from two sides of said connection tube, and a cap having four second lugs and each second lug having a hole, said second lugs connected to said first lugs by bolts extending through said holes in said second lugs and threadedly engaged with said first lugs to seal said top of said groove.

2. The switch assembly for a barbecue grill as claimed in claim 1 further comprising an extension tube extending from said connection tube.

* * * * *